(12) United States Patent
Dunaway et al.

(10) Patent No.: US 6,228,935 B1
(45) Date of Patent: May 8, 2001

(54) HIGH SOLIDS COPOLYMER DISPERSION FROM A LATEX AND ITS USE IN CAULKS, SEALANTS AND ADHESIVES

(75) Inventors: James H. Dunaway, Cuyahoga Falls; Pamela K. Hernandez, Brunswick; Gregory P. Bidinger, Copley, all of OH (US)

(73) Assignee: Tremco Incorporated, Beachwood, OH (US)

( * ) Notice: Subject to any disclaimer, the term of this patent is extended or adjusted under 35 U.S.C. 154(b) by 0 days.

(21) Appl. No.: 09/449,651

(22) Filed: Nov. 30, 1999

Related U.S. Application Data (60) Division of application No. 08/921,305, filed on Aug. 29, 1997, now Pat. No. 6,040,380, which is a continuation-in-part of application No. 08/690,288, filed on Jul. 26, 1996, now Pat. No. 5,744,544, which is a continuation-in-part of application No. 08/321,288, filed on Oct. 11, 1994, now Pat. No. 5,541,253.

(51) Int. Cl.[7] .............................. C08L 31/00; C08L 33/00
(52) U.S. Cl. ........................................... 524/832; 524/833
(58) Field of Search ..................................... 524/832, 833

(56) References Cited

U.S. PATENT DOCUMENTS

| | | |
|---|---|---|
| 2,111,266 | 3/1938 | Hopkins . |
| 3,513,121 | 5/1970 | Heaton . |
| 3,551,374 | 12/1970 | Reinhard et al. . |
| 3,616,166 | 10/1971 | Kelley . |
| 3,707,585 | 12/1972 | Okamoto et al. . |
| 4,011,388 | 3/1977 | Murphy et al. . |
| 4,125,700 | 11/1978 | Graham . |
| 4,130,523 | 12/1978 | Hoy et al. . |
| 4,135,043 | 1/1979 | Kast et al. . |
| 4,269,959 | 5/1981 | Lawton . |
| 4,395,500 | 7/1983 | Lohr et al. . |
| 4,456,726 | 6/1984 | Siol et al. . |
| 4,495,318 | 1/1985 | Howard . |
| 4,656,218 | 4/1987 | Kinoshita . |
| 4,668,730 | 5/1987 | Iovine et al. . |
| 4,680,200 | 7/1987 | Solc . |
| 4,707,515 | 11/1987 | Gilch et al. . |
| 4,713,420 | 12/1987 | Henton . |
| 4,721,748 | 1/1988 | Iovine et al. . |
| 4,783,502 | 11/1988 | Fahler . |
| 4,794,065 | 12/1988 | Hedvall et al. . |
| 4,810,763 | 3/1989 | Mallya et al. . |
| 4,870,143 | 9/1989 | Hashiguchi et al. . |
| 5,037,880 | 8/1991 | Schmidt et al. . |
| 5,051,464 | 9/1991 | Johnson . |
| 5,133,992 | 7/1992 | Nair et al. . |
| 5,352,720 | 10/1994 | Aydin et al. . |
| 5,442,006 | 8/1995 | Aydin et al. . |
| 5,541,253 | 7/1996 | Dunaway et al. . |
| 5,744,544 | 4/1998 | Dunaway et al. . |
| 6,040,380 | * 3/2000 | Dunaway et al. .................... 524/832 |

FOREIGN PATENT DOCUMENTS

| | | |
|---|---|---|
| 0 259 734 A2 | 3/1988 | (EP) . |
| 0 439 941 A1 | 8/1991 | (EP) . |
| 515 719 | 2/1992 | (EP) . |
| 0 515 719 A1 | 12/1992 | (EP) . |

OTHER PUBLICATIONS

"Ultra High Solids Copolymer Emulsion for Demanding Applications" by Mary L. Houseman, et al., *Adhesive Age*, pp. 49–50, 54, 56–57, 59–60 (Oct. 1, 1995).

*Recent Developments in Separations Sciences*, vol. 4, pp. 71–82, (Jan. 1, 1978), published by CRC Press Inc., Boca Raton, FL, USA.

*Journal of Polymer Science*, vol. 50, pp. 123–147 (Jan. 1, 1993), published by John Wiley & Sons, Inc., New York, New York.

*Journal of Paint Technology*, vol. 42, No. 550, pp. 579–587 (Nov. 1, 1970), by Do Ik Lee, published by Federation of Societies for Paint Technologies: Philadelphia, PA.

* cited by examiner

Primary Examiner—Nathan M. Nutter
(74) Attorney, Agent, or Firm—Calfee, Halter & Griswold, LLP (57) ABSTRACT

A method for polymerizing predominantly one or more acrylate and/or vinyl acetate monomers in the presence of a latex results in high solids dispersions of polymer particles with lower viscosities than traditionally observed. A significant wt. % of added monomers can be present in large particles, having nonspherical shapes. Some of the original latex particles are retained during the polymerization and these increase the solids content and lower the viscosity by packing in the interstices between large particles. The total polymer solids content can easily be varied from 70 to 92 or more wt. % which are higher than achieved in any previously reported aqueous polymerizations. The viscosities at very high solids contents become paste-like but the materials still are stable to storage and further handling without breaking the dispersion into an agglomerated polymer portion and released water. The dispersions are useful to form sealants, membranes, etc., either with or without other additives. A preferred use is as an acrylate water-based caulking compound where the high solids and thixotropy of the dispersion allows for formation of a water-based caulk with low shrinkage.

17 Claims, 1 Drawing Sheet

FIG. 1

HIGH SOLIDS COPOLYMER DISPERSION FROM A LATEX AND ITS USE IN CAULKS, SEALANTS AND ADHESIVES

This application is a divisional of U.S. application Ser. No. 08/921,305 filed Aug. 29, 1997 and now U.S. Pat. No. 6,040,380 which is a continuation-in-part of U.S. application Ser. No. 08/690,288, filed Jul. 26, 1996, for "High Solids Copolymer Dispersion From a Latex and its Use in Sealants," which issued as U.S. Pat. No. 5,744,544, on Apr. 28, 1998, and which is a continuation-in-part of U.S. application Ser. No. 08/321,288, filed Oct. 11, 1994, for "High Solids Copolymer Dispersion From a Latex and its Use in Sealants," which issued as U.S. Pat. No. 5,541,253 on Jul. 30, 1996.

FIELD OF INVENTION

This invention relates to high solids, free radical polymerizations of acrylate and/or vinyl acetate monomers in a latex resulting in high solids (desirably greater than 50 wt. %, preferably 70–95 wt. %) dispersion of polymer particles. The monomer composition polymerized in the presence of the latex need not be similar to the composition of the monomers used to make the latex and may be chosen to modify the properties of dried films from the dispersion. The high solids makes the material economical to ship or store and when formulated into a caulking sealant results in a sealant with low modulus, high elongation and low shrinkage.

BACKGROUND

Traditionally, higher performance sealants and caulks have been formulated using solvent based polymer systems such as silicone and polyurethane polymers as the binder for the sealant formulation. These solvent based types of sealant formulations generally yield sealants with good application properties (thixotropy and viscosity) and in the cured form typically have the elastomeric properties and adhesion required for a high performance sealant or caulking material. However, in recent years, with increasing government regulation and heightened consumer awareness, the manufacturers of solvent based sealants are coming under increasing pressure to reduce the VOC (volatile organic content) of their product (i.e. organic solvent content).

Dispersions of polymer particles in water have been used extensively in water-based sealants such as coatings and caulking. Their low viscosity, low volatile organic emissions, and ease of application have been favorable factors for their use. However, irrespective of the polymer particle sizes there has been a barrier at from 40–65% solids (depending on emulsifier type and other conditions) above which dispersions of polymer particles are difficult to prepare. Therefore high solids sealants were made by adding fillers. The fillers dilute the polymer in the final application lowering elongation and increasing modulus. Polymers having low Tg values (such as below 0° C.) which are particularly useful in formulating sealants and caulks requiring low temperature flexibility are sticky.

One example of high solids polymerization is European Patent Publication No. 0 515 719 Al, which discloses a self-adhering acrylate copolymer, which can be used for the production of self-adhering surface layer formulations. This acrylate copolymer is produced by a combined suspension and emulsion polymerization. The solids content recited are 30–70 wt. % and the examples show 65 wt. % solids.

An article by Do Ik Lee in the Journal of Paint Technology, Vol. 42, No. 550 (1970) pp 579–587 discusses the packing of binary mixtures of spheres.

U.S. Pat. No. 4,130,523 to Hoy and Peterson discloses nearly 70 volume % solids. Their latex particles are desirably no larger than 1.5 microns in diameter.

It is the object of the current application to polymerize in the presence of a preformed latex additional monomers creating a high solids, low viscosity, thixotropic product especially useful in coatings and sealants.

SUMMARY OF THE INVENTION

It has been found that a latex dispersion of latex polymer particles, when used as the medium for a further polymerization, can result in high solids content (such as 70–95 wt. %) polymer particle dispersions with lower viscosities than achieved with traditional polymerization. The resulting dispersions show bimodal or multimodal particle size distributions with particle diameters ranging from around 0.05 to 100 microns. The resulting broad particle size distribution, and good mixing during polymerization are believed to be major factors allowing high solids contents to be achieved.

Upon removal of shear, the polymer particle dispersions thicken but are capable of being liquified. The large particles (above 4 $\mu$m) when formed are typically nonspherical, desirably having an average aspect ratio between the largest and smallest diameter of each particle of at least 1.5.

BRIEF DESCRIPTION OF THE FIGURES

FIG. 1 shows an acrylate dispersion made similarly to Examples 1–3 at a magnification of about 675X. Table VI shows the specific pH and weight percent solids of A–K. The breadth of the particle size distribution and variation in shape of the particles are easily seen by this microscopic examination technique which sandwiches a drop of the polymer dispersion between two microscope slides.

DETAILED DESCRIPTION OF THE INVENTION

High solids polymer particle dispersions are created by polymerizing monomers in the presence of a latex (i.e., using the latex as the polymerization medium). A latex, as specified herein, is defined as a dispersion of small polymer particles (i.e. weight average particle diameters of less than 2 $\mu$m) in a water-based media. The latex serves as a primary source of the smaller particles in the final dispersion of particles. The latex also serves as the water-based media for further polymerization Also, mixtures of latexes can be used as the starting material giving even more flexibility to the composition and properties of the final dispersion and films or caulks derived from the dispersion. Such dispersions are usually thixotropic, especially at solids above 75 percent by weight. The thixotropy enhances the uses of the polymer in sealant applications where the material is applied with a low viscosity at a high shear rate. The material can have a high viscosity and thus resist flow (such as runoff) under low shear conditions. Preferred polymers for the process and sealants include poly-(acrylate), poly(vinyl acetate), and copolymers or combinations thereof.

The monomers polymerized in the presence of the latex are desirably added over a period of time such as by metering them into the latex or metering the latex and monomers simultaneously. The preferred monomers have low water solubilities (i.e., less than 5 wt. % soluble in water) such that dispersed monomer droplets are formed. These droplets can be converted into polymer particles by polymerization. The large polymer particles ultimately created in this polymerization, vary from about 2 to about 200 μm in diameter. The solids content of the dispersion of polymer particles is desirably at least 50, 60, 65, 75, 77 or 80 wt. %. Desired ranges are also from 70 to 95 wt. % or 75 to 85, 88, 90 or 92 wt. % of the dispersions.

The technique of adding monomer to a preformed latex can be conducted with any acrylate or vinyl acetate based latex. The viscosity of the dispersion will generally be lower than similar dispersions made by other sequences of emulsion and suspension polymerization. When the starting latex has from 40 to 68% solids, the resulting dispersion of polymer particles can have greater than 70 wt. % or preferably 75 to 92 wt. % solids.

The starting latexes with from 40 to 68 weight percent solids vary from standard emulsion polymerized latexes because they are often bimodal or multimodal. This is because wide particle size distributions or multimodal distributions are known to have lower (processable) viscosities at high solid levels. The higher solids starting latexes can be readily achieved by shifting the diameter of one or more modes or increasing or decreasing the amount of particles of one or more particle diameter. The technology to create broad or multimodal distributions is disclosed in European Patent Publication No. 0 515 719 Al and U.S. Pat. No. 4,130,523, both further identified in the Background of this application and hereby incorporated by reference. A review article entitled "Concentrated Colloidal Dispersions", Faraday Discussions of the Chemical Society, No. 76, published by the Royal Society of Chemistry, London 1983 is hereby incorporated by reference and, further describes various ways to prepare high solids latexes.

Commercially available high solids latexes are available under the name Rhoplex™ 2620 from Rohm and Haas at 62 weight percent solids being an acrylate latex; under the designation CarbobondT™ XPD 2254 available at about 67 percent solids from The BFGoodrich Company, Brecksville, Ohio, which was used in Examples 1–4; and under the name Acronal V275™ available from BASF at 65 weight percent solids. The Acronal V275™ varies from the other two latexes in having a few weight percent of acrylonitrile included in the polymer.

During the polymerization in the presence of the latex, new small particles (less than 0.5 μm and sometimes less than 0.10 μm in diameter) have been observed initially. At a certain solids content (depending on many factors such as the emulsifiers, monomers of the latex, and monomers added during the polymerization) the relative number of new small particles appears to decrease (presumably due to agglomeration) and larger particles (greater than 2 μm diameter) are observed in greater numbers. The agglomeration of small particles into larger particles seems to occur in a controlled manner without the formation of coagulum (which would be expected in typical polymer dispersions in water when agglomeration occurs). Although the above particles are often seen the method of polymerization does not require their presence. In examples 1 and 2, the larger particles are in the 2 to 4 μm diameter range while in the later Examples the particles exist at modes in diameter from 2 to 4 and 8 to 30 μm in diameter. Thus, Examples 1 and 2 show bimodal distributions while Examples 3 and 4 show trimodal distributions of particle diameters.

These high solids polymer dispersions are particularly useful for sealants, especially caulking-type water-based sealants. The evaporation of water from conventional low solids water-based caulks during curing causes extensive undesirable shrinkage. The shrinkage in water-based caulking results in residual stresses and strains which may cause the caulking to pull away from one or more of its bonded surfaces. By decreasing the relative amount of water in caulking formulations one can decrease the maximum water loss and maximum amount of shrinkage. When a caulking formulation starts with a higher solids polymer dispersion, the final caulk can achieve still higher solids content with the addition of nonvolatile fillers. Alternatively the caulking formulation may achieve equivalent solids content with less fillers. This usually results in a caulking formulation with higher elongation, lower modulus, and increased adhesion to the substrate.

The viscosity of a caulk increases with the addition of particulate solids to low solids polymer dispersions. The addition of large amounts of particulate solids to a water based caulking formulation greatly increases the modulus and decreases the ultimate elongation at break of the cured formulated caulking compound and therefore reduces the performance of the caulking material.

The viscosities of these dispersions vary with solids content but are generally lower than those produced by other aqueous polymerizations. For a 75 wt. % or more solids dispersion the viscosity is desirably less than 30,000 cps at 24° C., 20 rpm, with a cone and plate viscometer. More desirably the viscosity is less than 20,000 cps. At 70 to 80 wt. % solids the viscosity is desirably less than 10,000 cps under the same measuring conditions.

Preferred monomers for the latex and/or the polymerization in the presence of the latex are one or more alkyl acrylates having 4 to 16 or desirably 4 to 12 carbon atoms such as ethyl, butyl, and ethylhexyl acrylate and/or vinyl acetate. Alkyl (alkyl)acrylates are included in the general term the alkyl acrylates, although they tend to have higher glass transition temperatures. Preferably, the polymers in either or both the latex polymer particles or the larger polymer particles have at least 50, 70, 75, 80, or 90 wt. % of their repeat units derived from the alkyl acrylates or vinyl acetate and preferably just alkyl acrylates. Such acrylates are derived from the esterification of one or more (alkyl) acrylic acids, such as methacrylic acid and one or more alkyl alcohols having 1 to 12 carbon atoms. Also preferred for the principal polymer as specified above (i.e., at least 70, 80, or 90 wt. % thereof) is that it be a substantially non-crystalline polymer (e.g. elastomeric or behaving as an elastomer at 20° C.) having a Tg of 0° C. or less and preferably −20° C. or less. These type polymers when properly cured can have reversible elongations of 200 percent or more and are thus called elastomers.

Other monomers that can be used include the ethylenically unsaturated monomers. These include monomers having from 3 to 16 carbon atoms and optionally one or more heteroatoms of O, N, Cl and/or F. These include the conjugated dienes (preferably 4 to 8 carbon atoms); other monomers having carboxylic acid or ester functionality such as di-n-butyl maleate; acrylic acid; maleic anhydride; isobutyl itaconate; acrylonitrile; (alkyl)acrylonitriles; acrylamides; and derivatives thereof; alpha-methylstyrene, styrene, vinyl chloride, vinylidene chloride, vinyl propionate and other higher esters of the vinyl acetate family having from 4 to 30 carbon atoms. Multifunctional monomers capable of crosslinking such as diacrylates or divinylbenzene may also be used. Other monomers also include functionalized acrylates having from 4 to 16 carbon atoms such as acrylates having pendant carbon-carbon double bonds or pendant epoxy rings. These above listed monomers may optionally be present in the latex used as polymerization media. These monomers are desirably present in complementary amounts to the acrylates and vinyl acetate (i.e. 100%—the wt. % acrylates and/or vinyl acetate).

Desirably, the monomers used to form the larger particles include 10 wt. % or less, desirably 7 wt. % or less of the highly water soluble monomers (i.e., those with solubilities in water of 5 or 10 wt. % or greater). Examples of the limited highly water soluble monomers include olefinic monoacids having 3 to 10 carbon atoms, acrylic acid, olefinic diacids having 4 to 12 carbon atoms, and acrylonitriles having 3 to 10 carbon atoms.

The preferred media for the latex is water or blends thereof which blends are substantially (i.e., 70, 80, 90 or more wt. %) water. Solvents may be used in small amounts in the blend such as alcohols, glycols, chlorinated alkyls, etc.

The emulsifiers (a term which includes surfactants) useful in the latex or the latex polymerization are the commercial anionic emulsifiers commonly used for emulsion polymerizations such as alkyl sulfonates or polysulfonates; olefin or polyolefin sulfonates or polysulfonates; and carboxylates or polycarboxylates made from alkyls, olefins, or polyolefins. Other emulsifiers such as nonionic or cationic emulsifiers can be used, as can blends of anionic and nonionic emulsifiers. Polymeric emulsifiers, formed during the reaction or added separately may also be used. The nonionic and cationic emulsifiers are desirably used in lesser amounts such as less than 50 wt. %, 30 wt. %, or 10 wt. % of the total emulsifiers at any time in the dispersion of polymer particles. Desirably, the emulsifiers are less than 10 wt. % and preferably less than 1 or 2 wt. % of the final dispersion of polymer particles.

Any conventional chain transfer agents for emulsion, dispersion, or suspension polymerization can be used. These additives function to reduce polymer branching and molecular weight, which serves to prevent macromolecular gel during polymerization.

The latex used as the medium for the polymerization of the additional monomers desirably has a pH from about 1 to 11 more desirably from 3 to 9, and preferably from about 5 to 7. It is preferred that the pH be adjusted with alkali metal hydroxides selected from Na, Ca, K, and Li; or ammonia; or amines having up to 3 substituents with each substituent having up to 15 carbon atoms. Ammonia is the most preferred.

The initiators for the polymerization of emulsion-sized polymer particles and/or larger polymer particles may be any of those known to the prior art. The initiators for the polymerization may be any of those known to the prior art for free radical polymerization in organic solvents, in bulk, or in aqueous media such as emulsion or suspension polymerization. Preferred initiators include oil soluble azo and peroxy thermal initiators typically used in solution polymerizations in organic solvents such as, but not limited to, 2, 2' azobisisobutyronitrile, 2, 2'-azobis (2, 4-dimethylvaleronitrile ), 2, 2'-azobis (2 methylbutyronitrile), di(2-ethylhexyl) peroxydicarbonate, tert-amyl peroxyneodecanoate, hexylene glycol peroxy neoheptanoate. Water soluble thermal initiators typically used in emulsion polymerization such as, but not limited to, ammonium persulfate can also be used successfully. Redox initiators such as, but not limited to, tert-butyl hydroperoxide or cumene hydroperoxide with sodium formaldehyde sulfoxylate or sodium bisulfite or potassium metabisulfite can also be used successfully . Oil soluble redox initiators such as benzoyl peroxide with N, N-dimethyltoluidine can also be used successfully.

The dispersion of polymer particles desirably has two or more groups of dispersed polymer particles resulting in a broad particle size distribution. One group is polymer particles of a weight average diameter from about 0.05 to 0.7 $\mu$m and more desirably from 0.08 to 0.6 $\mu$m. Another group is desirably from 0.7 to 4 $\mu$m and more desirably from 1.0 to 3.5 or 4$\mu$m. The particles between 0.05 and 0.7 $\mu$m and some of the particles between 0.7 and 4 $\mu$m will primarily be derived from the latex and are desirably present from about 2 to about 20 wt. %, more desirably from about at least 10 to 20 wt. % of the total polymer particles. In the final dispersion of polymer particles, these particles from the latex will be present (probably in fewer number) as one or more modes in the particle size distribution. These modes in the particle size distribution are desirably present at diameters of from 0.05 $\mu$m to 0.6 $\mu$m or 0.7 $\mu$m and from 0.7 $\mu$m to 4 $\mu$m, and more desirably from 0.1 $\mu$m to 0.5 $\mu$m and 1,0 $\mu$m to 3.5 $\mu$m, and most preferably around 0.3 $\mu$m and 2.0 $\mu$m. Thus at least one mode will be less than 1 $\mu$m and at least one mode will be greater than 1 $\mu$m. Another group of particles will be present having particle diameters greater than from 4 $\mu$m to 100 $\mu$m or 200 $\mu$m. As these large particles (greater than 4 $\mu$m in diameter) are later disclosed to be nonspherical the diameter values recited herein are calculated average diameters for each particle reported by dynamic light scattering particle size measurements. These particles will result in a mode in the particle size distribution desirably from 4 $\mu$m to 100 $\mu$m and preferably from 6 $\mu$m to 40 $\mu$m. Each of these particle size ranges will have a weight mean particle size. Desirably, the weight mean particle size of the large (greater than 4 $\mu$m) polymer particles will be from 5 to 30 times the weight mean particle size of the small (4 $\mu$m or less) polymer particles. Desirably, for the higher solids polymer dispersions, at least 5, 10, 15, 60, or 70 wt. % of the polymer of the dispersion are these large particles having a diameter of at least 4 $\mu$m and more desirably between 4 $\mu$m and 100 $\mu$m. Desirably, at least 70, 80, or 90 wt. % or more of the particles in the dispersion fall into the combined small and large size ranges specified.

The particle size distributions found in the polymer dispersions are different than the normal particle size distributions created by emulsion or suspension polymerizations. In bimodal and multimodal particle size distributions it is possible to have at least 30, 35 or 50 weight percent of the particles having an average diameter greater than 1 $\mu$m and more desirably between 1 and 4 $\mu$m with the high solids contents previously described. A preferred multimodal distribution is from 5 to 30 weight percent of the particles having diameters between 0.05 and 0.7 $\mu$m; 20 to 70 weight percent of the particles having diameters from 0.7 to 4 $\mu$m; and 5 to 75 weight percent and more desirably 30 to 75 weight percent having particle diameters from 4 to 100 $\mu$m.

The particle diameters referred to herein are those determined by light scattering measurements. These correlate well with measurements by diffusion and sedimentation, column chromatography, and examination in an electron microscope. When average sizes are referred to without a basis, weight average sizes are preferred. A mode in a particle size distribution is used to define a peak or maxima therein. When a mode is defined as having particles therein, this means the mode is the predominant diameter present in a peak of the particle size distribution.

The process of this disclosure is the formation of a stable dispersion of polymer particles, by polymerizing unsaturated monomers in a preformed latex. The additional monomer is added either in a batch, by metered addition or added incrementally over a period of time. By this process a substantial portion of the added monomers are converted eventually into large polymer particles (such as from 2, 4, or 6 μm to 200 μm). It is desirable to add the free radical initiator over a period of time (e.g. during the polymerization), or to select free radical initiators that generate an effective level of free radicals over the course of the polymerization.

It is desirable that the monomers be added over a period of time (such as metered in) as from about ½ hour to 24 hours, desirably from 1 hour to 10 hours, and preferably from 1½ to 6 hours. It is also desirable that the selected initiator and polymerization temperature are such that monomers are readily converted to polymer particles during the period over which the monomers are added. Thus, the amount of unpolymerized monomers is minimized within the polymer dispersion and the reaction vessel during the polymerization by incremental or continuous addition of monomer and continuous polymerization of monomers to polymers.

Some of the original latex polymer particles may be lost due to agglomeration or coagulation during this process. However, a significant number of the smaller latex particles, e.g. 4 μm or less, are retained during this process. The presence of at least two substantially different diameter modes in the distribution of particle diameters within one dispersion of polymer particles is partially attributed with achieving solids contents above 70 wt. % in the form of flowable liquids or pastes. Many of the particles above 4 μm formed by the process have a nonspherical shape due to their method of formation. This results in an average aspect ratio for the particles above 4 μm in diameter, desirably above 1.5, and more preferably above 2. The average aspect ratio is the average from a group of particles of the quotient of the largest diameter over the smallest diameter of each particle. These values are usually determined by examination of electron microscope photographs of the particles.

The latex used as the primary source of the polymerization media is desirably a latex derived predominantly from one or more alkyl acrylate and/or vinyl acetate monomers. The other monomers previously described for use in the polymerization may also be present in the form of polymers or copolymers in the latex. Desirably, in one embodiment the polymers of the latex have at least 50, 70, 80 or 90 wt. % of their repeat units derived from alkyl acrylates and/or vinyl acetate and preferably from, alkyl acrylates having from 4 to 16 carbon atoms. The latex desirably is an anionically stabilized latex. That means the latex is primarily stabilized by anionic emulsifiers (a term which includes surfactants). Desirably the latex polymers contain at least 0.05 wt. % repeat units from unsaturated mono and dicatboxylic acid monomers and more desirably from 0.1 or 0.5 to 10 or 20 wt. %. Unsaturated carboxylic acid monomers include those having up to 12 carbon atoms. Such monomers include acrylic acid, methacrylic acid, itaconic acid, maleic acid and the like. The latex media is desirably 20 to 70 wt. % solids and more preferably 50 to 68 wt. % solids. The term solids refers throughout the specification to the determination of the components which do not readily volatilize within one hour at 105° C.

It is advantageous but not necessary to have two or more stirrers in the reaction vessel. The agitator of the reaction vessel most desirably is one capable of thoroughly mixing and homogenizing high viscosity highly thixotropic materials such as shown in the examples. Sufficient shear is desirable to maintain the thixotropic material in a shear thinned (liquid) state. The nonspherical particles above 4 μm in diameter are typically formed at higher solids where higher shear conditions exist. Thus a relationship between the mixing conditions and particle morphology is suggested. The agitator is desirably designed to come in close contact with the reactor walls and to thoroughly mix materials inside the reactor. An anchor type mixing blade is desirable.

Optionally, no additional emulsifiers are added with the additional monomers. It is believed that some of the emulsifiers from the latex are desorbed from the small particles and are adsorbed onto the monomer droplets and large polymer particles. It is recognized that sufficient emulsifier must be present to stabilize the particles against catastrophic coagulation. Thus, if insufficient emulsifier is present in the latex, additional emulsifier can be added during or after the monomer addition or prior to the addition of monomers.

The term thixotropic has been used to define the dispersion of polymer particles. The thixotropic dispersion refers to a dispersion wherein the measured viscosity decreases by a factor of from 5 to 1,000 when the shear rate (rpm) of the viscometer used to test the viscosity is increased from 1 rpm to 100 rpm, more desirably for this process the viscosity varies by a factor from 10 to 800, and preferably from 15 or 200. The viscosities are measured with a Brookfield cone and plate viscometer, Model DVII, at 25° C.

The polymerization temperature for polymerizing the monomers in the latex is desirably from 20 or 40 to 110° C., more desirably from 50 to 100° C, and preferably from 65 to 95° C.

The above dispersions can be formulated in low shrinkage caulking formulations, especially waterbased low volatile organic or volatile organic free formulations. The caulking formulation may include inorganic fillers such as chalk, talc, titanium dioxide (available in many forms as a white pigment), zinc oxide and kaolin clays. These fillers may be present at concentrations up to 70 wt. % of the solids. The caulking formulation may include various plasticizers such as low molecular weight (i.e. less than 10,000; 20,000; or 30,000 weight average molecular weight) polymers or oligomers which are compatible with the one or more polymers of the polymer dispersion. They serve to soften the polymer composition. The caulking formulation may include biocides (such as fungicides and mildewcides), U.V. stabilizers, antioxidants, adhesion promoters, viscosity modifiers (which increase or decrease viscosity) coalescing agents, and crosslinking agents. Preferably, at least 60, 70, 80, or 90 wt. % of the solids of the caulking formulation are the polymeric particles of the dispersion. (Note that solids here refer to nonvolatiles components at 105° C. for 1 hour.) Desirably the caulking releases less than 25 or 30, preferably less than 20 or 15 wt. % volatiles, (organic and water) on drying at 105° C. for 1 hour. Desirably the caulk has an extrudability by ASTM D2452 at 20 psi with a 0.104" orifice of less than 400 seconds at 25° C., more desirably from 10 to 400 seconds, and preferably from 20 to 100 or 200 seconds. The polymer dispersion may have polymers having 2 or more separate Tg values. Low Tg values are desirable for low temperature flexibility however they can be tacky at higher temperatures. By selecting the appropriate monomers for the latex and polymerization two or more phase separated polymers may be present in the caulk giving two Tg values and both low temperatures flexibility and low tack in one formulation.

EXAMPLES

Examples 1, 2, 3 and 4 show how the polymer dispersions of this invention were prepared at 72, 79, 80, and 87 percent solids.

PROCEDURE:

A 50:50 solution of the deionized water and concentrated ammonium hydroxide (29–30 wt. % $NH_3$) was prepared and added dropwise to a carboxylated latex with vigorous stirring to adjust the pH of the latex to about 6.0. The partially neutralized latex was then added to a reactor and stirred under nitrogen at 100 rpm. In a typical lab preparation a 4 liter jacketed resin kettle was used as the reactor. A low speed, high torque electrically powered stirrer equipped with an anchor type blade was used for agitation. The temperature was controlled using an external heating/cooling bath which circulates a water/glycol mixture through the resin kettle jacket. The latex was heated to 75° C. and a solution of the lauryl mercaptan, t-amyl peroxyneodecanoate, ethyl acrylate, and butyl acrylate was added over a 1.5 hour period. The batch temperature was maintained in the 75–85° C. range throughout the addition. Fifteen minutes after addition was complete, the t-butyl hydroperoxide (1.43 g) was added and cooling was begun. The t-butyl hydroperoxide was the first half of the red-ox scavenging system used to reduce the level of unreacted free monomer to an acceptable level. When the batch temperature reached 50° C, a solution of 33.3 wt. % the sodium formaldehyde sulfoxylate, deionized water and 33.3 wt. % anionic surfactant was added. The sodium formaldehyde sulfoxylate catalyzes the t-butyl hydroperoxide causing it to form free radical containing species which react with any residual free monomer. The batch was stirred for 1 hour more at 50° C. during which time the residual monomer was scavenged (consumed), then cooled to room temperature and removed from the reactor. The resultant polymer was very thixotropic. The particle size distribution was multimodal. The glass transition temperatures were measured using a heating/Perkin Elmer Model D5C7 differential scanning calorimeter using a heating/cooling rate of 10° C./minute.

The starting latex media for Examples 1, 2, 3 and 4 is a carboxylated acrylic latex having a solids content of about 66 weight percent and a pH of about 2 and a viscosity of about 200 cp. It is commercially available from The BFGoodrich Company under the tradename Carbobond™ XPD 2254.

In a continuous polymerization a heel of previously formed polymer would be added to the reactor and heater to the proper reaction temperature under a nitrogen blanket. Both the monomer solution and latex would then be pumped into the reactor at an appropriate rate and reacted polymer would be pumped out of the bottom of the reactor at a rate matching the combined rate of the latex and monomer addition. This type of reaction scheme would be very similar to a CSTR (continuous stirred tank reactor) set up. A plug flow type reactor could also be used.

TABLE I

Example 1
72.0 Percent Solids Acrylate Polymer

| REAGENT | WEIGHT (g) | WEIGHT (%) |
|---|---|---|
| Latex (67.3% solids) | 4545 | 84.36 |
| Ammonium hydroxide (29–30 wt %) | 21.5 | 0.40 |
| Deionized water | 21.5 | 0.40 |
| Lauryl mercaptan | 0.79 | 0.01 |
| t-amyl peroxyneo-decanoate | 3.11 | 0.06 |
| Ethyl Acrylate | 390 | 7.24 |
| Butyl Acrylate | 390 | 7.24 |
| t-butyl hydroperoxide | 1.43 | 0.03 |

TABLE I-continued

Example 1
72.0 Percent Solids Acrylate Polymer

| REAGENT | WEIGHT (g) | WEIGHT (%) |
|---|---|---|
| Sodium Formaldehyde Sulfoxylate | 2.86 | 0.05 |
| Deionized Water | 8.58 | 0.16 |
| Anionic Surfactant* | 2.86 | 0.05 |

*ABEX JKB ™ manufactured by Rhone-Poulenc

The final dispersion had a cone and plate viscosity (Brookfield Model No. DVII) of 600 cps at 100 rpm (75° F.) and 4,500 cps at 1 rpm (75° F.). The particle size distribution of this dispersion was typically bimodal with one mode centered at 0.4 to 0.7 microns and another mode centered at 1 to 3 microns. Fully coalesced and dried films of this dispersion exhibited two glass transition temperatures, one at −21 to −23° C. and one at −30 to −31° C. characteristic of different acrylate copolymers. The glass transition temperatures were measured using a Perkin Elmer Model DSC7 differential scanning calorimeter using a heating/cooling rate of 10° C.

TABLE II

Example 2
79.72 Percent Solids Acrylate Polymer

| REAGENT | WEIGHT (g) | WEIGHT (%) |
|---|---|---|
| Latex (67.3% solids) | 4545 | 60.12 |
| Ammonium hydroxide (29–30 wt %) | 21.5 | 0.28 |
| Deionized water | 21.5 | 0.28 |
| Lauryl mercaptan | 2.92 | 0.04 |
| t-amyl peroxyneo-decanoate | 11.59 | 0.15 |
| Ethyl Acrylate | 1450 | 19.18 |
| Butyl Acrylate | 1450 | 19.18 |
| t-butyl hydroperoxide | 5.32 | 0.07 |
| Sodium Formaldehyde Sulfoxylate | 10.64 | 0.14 |
| Deionized Water | 31.90 | 0.42 |
| Anionic Surfactant* | 10.63 | 0.14 |

*ABEX JKB ™

The final dispersion had a cone and plate viscosity (Brookfield Model DVII) of 6,000 cps at 100 rpm (75° F.) and 300,000 at 1 rpm (75° F.). Fully coalesced and dried films of this dispersion showed two separate glass transition temperatures as in Example 1. The particle size distribution of this dispersion was typically bimodal with one mode centered at 0.4 to 0.7 microns and the second mode centered at 2 to 4 microns.

TABLE III

Example 3
87.17 Percent Solids Acrylate Polymer

| REAGENT | WEIGHT (g) | WEIGHT (%) |
|---|---|---|
| Latex (67.3% solids) | 4545 | 36.26 |
| Ammonium hydroxide (29–30 wt %) | 21.5 | 0.17 |
| Deionized water | 21.5 | 0.17 |
| Lauryl mercaptan | 7.9 | 0.06 |
| t-amyl peroxyneo-decanoate | 31.2 | 0.25 |
| Ethyl Acrylate | 3877 | 30.92 |
| Butyl Acrylate | 3877 | 30.92 |
| t-butyl hydroperoxide | 14.3 | 0.11 |

TABLE III-continued

Example 3
87.17 Percent Solids Acrylate Polymer

| REAGENT | WEIGHT (g) | WEIGHT (%) |
|---|---|---|
| Sodium Formaldehyde Sulfoxylate | 28.6 | 0.23 |
| Deionized Water | 85.8 | 0.68 |
| Anionic Surfactant* | 28.6 | 0.23 |

*ABEX JKB ™

The final dispersion has a cone and plate viscosity (Brookfield Model DVII) of <10,000 cps at 100 rpm (75° F.) and >100,000 at 1 rpm (75° F.). The polymer exhibits good long term storage stability. The polymer was easily spread into thin films. The particle size distribution of this dispersion was typically trimodal with one mode centered at 0.4 to 0.7 microns, one mode centered at 2 to 4 microns and a third mode centered at 8 to 30 microns. Fully coalesced and dried films of this dispersion show two separate glass transition temperatures as in Examples 1 and 2.

A similar latex to Example 3 was made using the same procedure and recipe but substituting as the starting latex Rhoplex™ 2620 (commercially available latex) from Rohm and Haas at 62 weight percent solids and having a monomer composition similar to Carbobond™. The resulting polymer dispersion had 85.8 weight percent solids and a viscosity at a pH of 6 similar to Example 3.

Another similar latex to Example 3 was made using the same procedure and recipe but substituting as the starting latex Acronal V275™ from BASF at 65 weight percent solids and having a monomer composition similar to Carbobond™ plus a few weight percent acrylonitrile. The resulting polymer dispersion had 86.5 weight percent solids and a viscosity at a pH of 6 similar to Example 3.

Example 4

An example of a polymerization using only butyl acrylate in the second added monomer is shown in Table IV. This polymerization used the same starting latex as in examples 1, 2 and 3. Also, the same procedure was used as in Examples 1, 2 and 3.

TABLE IV

Example 4
79% Solids Acrylate Polymer

| REAGENT | WEIGHT (g) | WEIGHT (%) |
|---|---|---|
| Latex (67.3% solids) | 4545 | 61.38 |
| Ammonium hydroxide (29–30 wt %) | 21.5 | 0.29 |
| Deionized water | 21.5 | 0.29 |
| Lauryl mercaptan | 2.9 | 0.04 |
| t-amyl peroxyneo-decanoate | 11.6 | 0.16 |
| Butyl Acrylate | 2744 | 37.06 |
| t-butyl hydroperoxide | 10.6 | 0.07 |
| Sodium Formaldehyde Sulfoxylate | 32.0 | 0.14 |
| Deionized Water | 32.0 | 0.43 |
| Anionic Surfactant* | 10.6 | 0.14 |

*ABEX JKB ™

The final dispersion had a cone and plate viscosity (Brookfield Model DVII) of 6,100 cps at 100 rpm (75° F.) and 70,000 cps at 1 rpm (75° F.). The particle size distribution of the dispersion was typically trimodal with one mode centered at 0.4 to 0.7 microns, another mode centered at 2 to 4 microns and a third mode centered at 8 to 30 microns. Fully coalesced and dried films of this dispersion show two separate glass transition temperatures, one at −21 to −23° C. which is characteristic of the starting latex and another at −45 to −53° C. which is characteristic of polybutyl acrylate. The glass transition temperatures were measured using a Perkin Elmer Model DSC7 differential scanning calorimeter using a heating/cooling rate of 10° C./minute. Dried films of this dispersion exhibit both the low temperature flexibility expected of a material such as polybutylacrylate with a Tg of −45 to −53° C. as well as the lower tack surface associated with a higher Tg polymer such as the starting latex.

Example 5

An example of a polymerization using a vinyl acetate type starting latex is illustrated in Table V. The procedure for making this polymer was identical to that used for an acrylic starting latex. The latex used in this example is a commercially available ethylene vinyl acetate latex manufactured by Air Products, Inc. The latex has a trade name of Airflex® 500. This latex had a solids content of 55% by weight, a pH of 4.9 as received and a Tg of 5° C.

TABLE V 82.3 Percent Solids Vinyl Acetate - Acrylate Polymer

| REAGENT | WEIGHT (g) |
|---|---|
| Airflex ® 500 (pH adjusted to 5.6) (vinyl acetate latex) | 4550 |
| Lauryl Mercaptan | 7.3 |
| Ethyl Acrylate | 3750 |
| Butyl Acrylate | 3750 |
| T-Amyl Peroxy Neodecanoate | 22.8 |
| T-Butyl Hydroperoxide | 14.3 |
| Sodium Formaldehyde Sulfoxylate | 28.6 |
| Anionic Surfactant/Deionized water (1 part surfactant/4 parts water) | 120 |

The final dispersion had a solids content of 82.3% by weight. This dispersion had a cone and plate viscosity (Brookfield Model No. DVII) of less than 20,000 cps at 50 rpm (75° F.) and less than 1,000,000 cps at 1 rpm (75° F.).

Example 6

Figure 1:
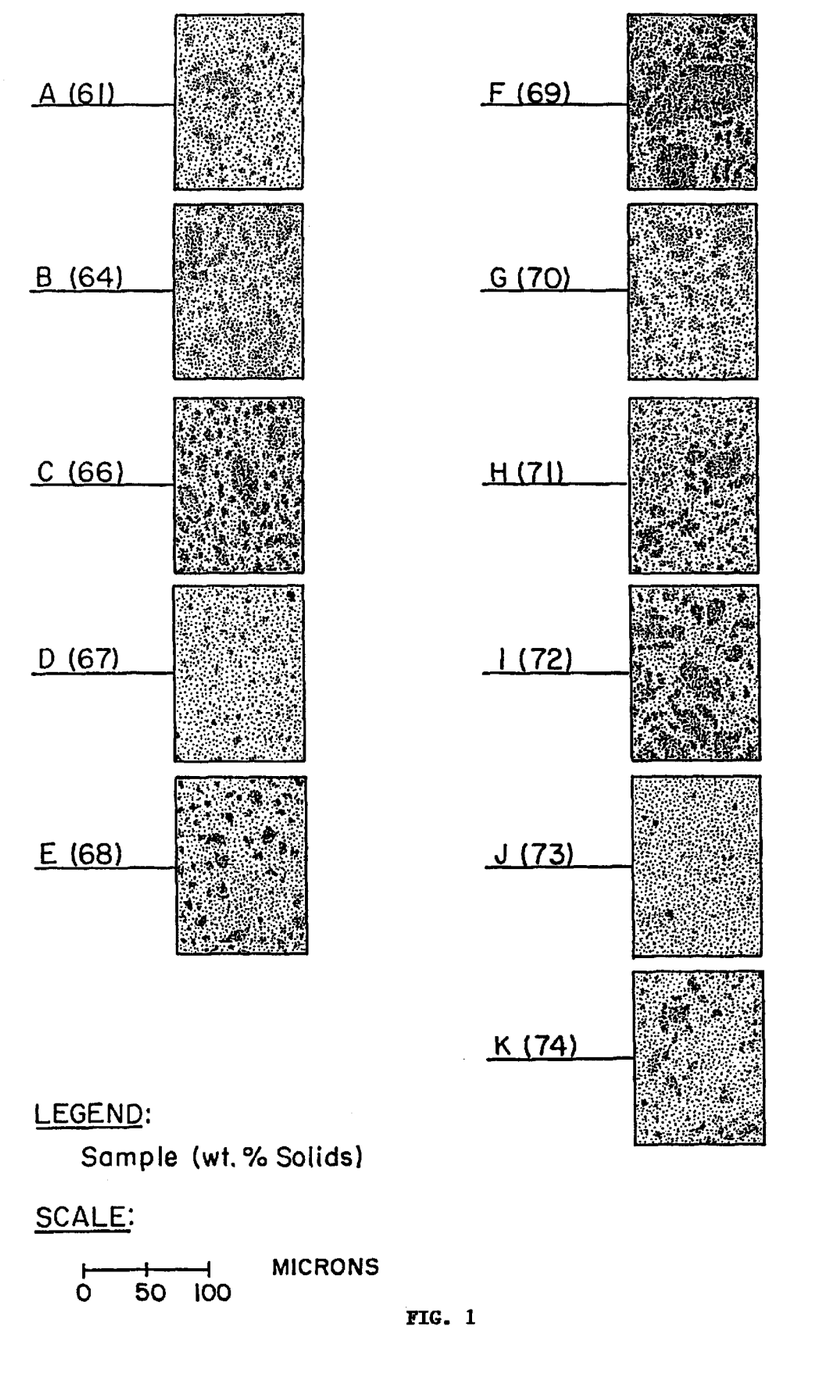

The monographs of FIG. 1 show a series of wet polymer dispersions prepared similarly to Examples 1–4 that have been sandwiched between two microscope slides. These polymers were not diluted. These micrographs show the range in particle size distribution and morphology that can be achieved in the pH and solids range shown by samples A–K in the following Table VI.

TABLE VI

| SAMPLE | pH | WEIGHT PERCENT SOLIDS |
|---|---|---|
| A | 61 | 5.95 | 85.5 |
| B | 64 | 5.95 | 88.0 |
| C | 66 | 6.8 | 88.0 |
| D | 67 | 5.1 | 83.0 |
| E | 68 | 5.95 | 85.5 |
| F | 69 | 5.1 | 88.0 |
| G | 70 | 5.95 | 88.0 |
| H | 71 | 5.1 | 85.5 |
| I | 72 | 5.1 | 88.0 |
| J | 73 | 6.8 | 83.0 |
| K | 74 | 5.1 | 85.5 |

Example 7

A typical sealant formulation using a dispersion of polymer particles of this disclosure is shown below:

TABLE XVII

| INGREDIENT | WEIGHT IN FORMULATION | WEIGHT (%) |
|---|---|---|
| Polymer Particle Dispersion (85% Solids) | 2500 g | 93.04 |
| Fungicide | 2.5 g | 0.09 |
| Ethylene Glycol | 27.0 g | 1.00 |
| Propylene Glycol | 27.0 g | 1.00 |
| Mineral Oil | 116.0 g | 4.32 |
| Epoxy Silane | 9.4 g | 0.35 |
| Mildewcide | 5.0 g | 0.19 |

The sealant was formulated using a planetary mixer having a working capacity of about ¾ gallons, and capable of handling viscous, thixotropic materials and having vacuum mixing capability. The mixer had variable mixing speeds from 40 to 200 rpm. The dispersion of polymer particles, fungicide and glycols was added to the mixer and mixed until uniform, usually from 5–10 minutes. The mineral oil, epoxy silane and mildewcide were then added and mixed until uniform. The pH of the batch was then adjusted by adding a mixture of 50/50 concentrated ammonia/deionized water to the desired final batch pH, which was typically between 6.5 to 8.0. The material was then mixed with vacuum for 20 minutes to remove any air from the sealant. The material was then packaged into cartridges.

Example 8

Several examples from U.S. Pat. No. 4,130,523 ('523) were prepared to compare the viscosity values generated at different solids contents to the viscosities generated by the method of this disclosure. The viscosities are shown below.

TABLE XVIII

| Wt. % Solids | '523 Ex. 1 pH = 6.4 | '523 Ex. 2 | Method of this Disclosure pH = 6.0 | Method of this Disclosure pH = 6.0 | Method of this Disclosure pH = 9 |
|---|---|---|---|---|---|
| 52 | | | 52 | | |
| 57 | 1,000 cps | | 55 | | |
| 58.6 | | | | | 59 |
| 62 | | | 79 | | |
| 63 | 5,000 cps | | | | |
| 63.9 | | 1,460 | | | |
| 67 | | | 118 | 241 | |
| 68.4 | 11,000 | | | | 444 |
| 72 | | 18,000 | 314 | | |
| 77 | | | 750 | | |
| 82 | | | 12,700 | | |
| 85.5 | | | 50,000 | | |

Viscosities @ 24° C., 20 rpm with a cone and plate viscometer.

The dispersion of polymer particles is useful as a source of bulk polymer or as an alternative to a conventional latex. It may be used for molding or forming operations, as a thixotropic material for flexible or rigid membranes or in coatings or in sealants. A formulated sealant from the dispersion of polymer particles is useful as a thixotropic material for flexible or rigid membranes or coatings, or as a thixotropic sealant or caulk. The caulk is useful in residential or commercial construction or maintenance. It functions to seal interstices either in a structural material or between two or more structural materials or functions to fill expansion joints in concrete or other building structures.

The caulking compounds and sealants according to the invention may be gunned or extruded or otherwise formed into various profiles with conventional equipment such as caulking guns and caulking tubes. They can be formulated desirably to have volume shrinkage values from about 5 to 30%, and more desirably from 8 to 20%.

These caulking compounds have lower shrinkage, high elongation, low modulus, good adherence to a variety of substrates, and a fast dry to a low tack surface. They are non-staining and form a dried caulk that is easily coated with traditional latex or oil-based commercial coatings.

The high solids polymer dispersions of this invention are also useful to formulate adhesives. The inherent low viscosity of these high solids polymer dispersions at high polymer solids contents makes them particularly useful in formulating high solids, low VOC, water borne adhesives. Also, the broad particle size distribution of these dispersions make them well suited to certain pressure sensitive adhesive applications such as respositionable adhesives. Optionally, various additives such as diluents and tackifiers may be added to reduce the viscosity of the wet adhesive or increase the tack of dried adhesive films. The adhesive comprises about 0.1 to about 9.5 parts water and 1 part high solids polymer dispersion, preferably about 0.33 to about 3 parts water and about 1 parts high solids polymer dispersion, more preferably about 0.5 to 2 parts water and 1 part high solids polymer dispersion. Preferably, the viscosity of the resulting adhesive is about 10 to 10,000 cps, more preferably, about 100 to 2,000 cps. Viscosity is measured at 75° C. using a Brookfield Model DVII cone and plate viscometer at 20 rpm.

These adhesives are applied by conventional techniques such as by roller, brush or spray to a substrate, to provide an adhesive film having a thickness of from about 5 to 200 μm, preferably from about 7 to 40 μm, more preferably from about 10 to 30 μm. Typical substrates to which these adhesives can be applied include, for example, paper, metal foil and polymer films such as polyester film. The adhesives are dried under ambient conditions or at elevated temperatures to provide dried adhesive films, preferably having less than about 5 wt. % water. The dried adhesive films are useful as repositionable pressure sensitive adhesives; and are useful to make self adhering repositionable materials.

Example 9

An adhesive as described above was formulated using the dispersion of Example 2. One part water was added to three parts high solids polymer dispersion to provide an adhesive. The adhesive had a viscosity of 35 cps measured at 75° F. using a Brookfield Model DVII cone and plate viscometer at 20 rpm. The adhesive was applied to a sheet of 20 lb stock paper by brush, then allowed to dry at ambient temperature for 30 minutes, and the dried at 120° F. for one hour to provide an adhesive film. The dried adhesive film had a coverage of 15–30/gm$^2$. A second sheet of 20 lb stock paper was placed on the dried adhesive film and pressure was applied to the paper. The second sheet of paper adhered satisfactorily to the dried adhesive film and the two sheets of paper remained affixed.

Example 10

An adhesive was formulated using the high solid polymer dispersion of Example 2. One part water was added to one part high solids polymer dispersion to provide an adhesive.

The adhesive had a viscosity of 10 cps measured at 75° F. using a Brookfield Model DVII cone and plate viscometer at 20 rpm. The adhesive was applied by brush to a sheet of 20 lb stock paper, then allowed to dry at ambient temperature for 30 minutes, and then dried at 120° F. for one hour to provide an adhesive film. The dried adhesive film had a coverage of 40–60 g/m². A second sheet of 20 lb stock paper was placed on the dried adhesive film and pressure was applied to the paper. The second sheet of paper adhered satisfactorily to the dried adhesive film and the two sheets of paper remained affixed.

While in accordance with the Patent Statutes, the best mode and preferred embodiment has been set forth, the scope of the invention is not limited thereto, but rather by the cope of the attached claims.

What is claimed is:

1. An adhesive composition comprising:
   a. one part of a high solids dispersion of polymer particles, said polymer dispersion comprising an aqueous dispersion being at least 77 wt. % discrete polymer particles polymerized from monomers comprising at least 50 wt. % acrylate monomers having 4 to 16 carbon atoms and/or vinyl acetate, said dispersion having a particle size distribution comprising a first mode and a second mode, wherein said first and second modes are selected from the group consisting of: a first mode having particles of diameter between 0.05 $\mu$m to 4 $\mu$m and a second mode having particles of diameter between above 4 $\mu$m to 100 $\mu$m; a first mode having particles of diameter between 0.05 $\mu$m and 0.7 $\mu$m and a second mode having particles of diameter between above 0.7 $\mu$m and 100 $\mu$m; and a first mode having particles of diameter less than 1 $\mu$m and said second mode having particles of diameter greater than 1 $\mu$m; and
   b. from about 0.1 to about 9.5 parts of water.

2. The adhesive composition according to claim 1, wherein the first mode has particles of diameters from about 0.05 $\mu$m to 4 $\mu$m and the second mode has particles of diameters from above about 4 $\mu$m to 100 $\mu$m.

3. The adhesive composition according to claim 1, wherein the first mode has particles of diameters between about 0.05 $\mu$m and 0.7 $\mu$m and the second mode has particles of diameters from about 0.7 $\mu$m to 100 $\mu$m, and wherein said particle size distribution has at least 20 weight percent of particles greater than about 1 $\mu$m in diameter.

4. The adhesive composition according to claim 1, wherein the first mode has particles of diameters less than 1 $\mu$m and the second mode has particles of diameters greater than 1 $\mu$m, and wherein said high solids polymer dispersion comprises at least 80 wt. % discrete polymer particles polymerized from unsaturated monomers comprising at least 50 wt. % acrylate monomers having 4 to 16 carbon atoms and/or vinyl acetate.

5. The adhesive composition according to claim 1, wherein the peak of the first mode is centered at particles of diameters from about 0.4 $\mu$m to 0.7 $\mu$m and the peak of the second mode is centered at particles of diameters from about 2 $\mu$m to 4 $\mu$m, and wherein said high solids polymer dispersion comprises at least 79 wt. % discrete polymer particles polymerized from unsaturated monomers comprising at least 50 wt. % acrylate monomers having 4 to 16 carbon atoms and/or vinyl acetate.

6. A method for adhering one substrate to another comprising the steps of:
   a. providing an adhesive, said adhesive comprising one part of a high solids dispersion of polymer particles, said polymer dispersion comprising an aqueous dispersion being at least 77 wt. % discrete polymer particles polymerized from monomers comprising at least 50 wt. % acrylate monomers having 4 to 16 carbon atoms and/or vinyl acetate, said dispersion having a particle size distribution comprising a first mode and a second mode, wherein said first and second modes are selected from the group consisting of: a first mode having particles of diameter between 0.05 $\mu$m to 4 $\mu$m and a second mode having particles of diameter between above 4 $\mu$m to 100 $\mu$m; a first mode having particles of diameter between 0.05 $\mu$m and 0.7 $\mu$m and a second mode having particles of diameter between above 0.71 $\mu$m and 100 $\mu$m; and a first mode having particles of diameter less than 1 $\mu$m and a second mode having particles of diameter greater than 1 $\mu$m; and from about 0.1 to about 9.5 parts of water;
   b. providing a first substrate, said first substrate having an application surface;
   c. providing a second substrate, said second substrate having an attachment surface;
   d. applying said adhesive to said application surface of said first substrate;
   e. then drying said adhesive; and
   f. then positioning said attachment surface of said second substrate on the dried adhesive.

7. The method according to claim 6, wherein the first mode has particles of diameters from about 0.05 $\mu$m to 4 $\mu$m and the second mode has particles of diameters from above about 4 $\mu$m to 100 $\mu$m.

8. The method according to claim 6, wherein the first mode has particles of diameters between about 0.05 $\mu$m to 0.7 $\mu$m and the second mode has particles of diameters from about 0.7 $\mu$m to 100 $\mu$m, and wherein said particle size distribution has at least 20 weight percent of particles greater than about 1 $\mu$m in diameter.

9. The method according to claim 6, wherein the first mode has particles of diameters less than 1 $\mu$m and the second mode has particles of diameters greater than 1 $\mu$m, and wherein, said high solids polymer dispersion comprises at least 80 weight percent discrete polymer particles polymerized from unsaturated monomers comprising at least 50 weight percent acrylate monomers having 4 to 16 carbon atoms and/or vinyl acetate.

10. The method of claim 6 further comprising the step of applying pressure to said second substrate or said first substrate after step f.

11. The method of claim 6 wherein said first substrate and said second substrate comprise paper.

12. A self-adhering repositionable material comprising:
    a. a substrate;
    b. a dried adhesive film disposed on said substrate, said dried adhesive film comprising discrete polymer particles polymerized from monomers comprising at least 50 wt. % acrylate monomers having 4 to 16 carbon atoms and/or vinyl acetate, said polymer particles having a particle size distribution comprising a first mode and a second mode, wherein said first and second modes are selected from the group consisting of: a first mode having particles of diameter between 0.05 $\mu$m to 4 $\mu$m and a second mode having particles of diameter between above 4 $\mu$m to 100 $\mu$m; a first mode having particles of diameter between 0.05 $\mu$m and 0.7 $\mu$m and a second mode having particles of diameter between above 0.7 $\mu$m and 100 $\mu$m; and a first mode having particles of diameter less than 1 $\mu$m and a second mode having particles of diameter greater than 1 $\mu$m.

13. The self adhering repositionable material according to claim 12, wherein the first mode has particles of diameters from about 0.05 μm to 4 μm and the second mode has particles of diameters from above about 4 μm to 100 μm.

14. The self adhering repositionable material according to claim 12, wherein the first mode has particles of diameters between about 0.05 μm to 0.7 μm and the second mode has particles of diameters from about 0.7 μm to 100 μm, and wherein said particle size distribution has at least 20 weight percent of particles greater than about 1 μm in diameter.

15. The self adhering repositionable material according to claim 12, wherein the first mode has particles of diameters less than 1 μm and the second mode has particles of diameters greater than 1 μm, and wherein said high solids polymer dispersion comprises at least 80 weight percent discrete polymer particles polymerized from unsaturated monomers comprising at least 50 weight percent acrylate monomers having 4 to 16 carbon atoms and/or vinyl acetate.

16. The self adhering repositionable material according to claim 12, wherein said substrate comprises paper.

17. The self adhering repositionable material according to claim 12, wherein said dried adhesive film contains less than about 5 wt. % water.

* * * * *